United States Patent [19]
Schelkmann

[11] 3,855,030
[45] Dec. 17, 1974

[54] METHOD AND APPARATUS FOR APPLYING A TREAD STRIP TO A CARCASS

[75] Inventor: Wilhelm Schelkmann, Witten, Germany

[73] Assignee: Vakuum Vulk Holdings Ltd., Nassau, Bahamas

[22] Filed: Apr. 12, 1972

[21] Appl. No.: 243,202

[52] U.S. Cl. ................. 156/130, 156/96, 156/129, 156/405
[51] Int. Cl. ............................................. B29h 17/37
[58] Field of Search ............. 156/96, 405, 406, 127, 156/128, 129, 130

[56] References Cited
UNITED STATES PATENTS

| | | | |
|---|---|---|---|
| 1,471,829 | 10/1923 | Converse | 156/128 R |
| 1,938,787 | 12/1933 | Abbott, Jr. | 156/405 |
| 1,270,380 | 6/1918 | Converse | 156/130 |
| 2,918,105 | 12/1959 | Harris | 156/406 X |
| 2,997,095 | 8/1961 | Trevaskis | 156/405 X |

FOREIGN PATENTS OR APPLICATIONS

| 212,565 | 1/1958 | Australia | 156/130 |
|---|---|---|---|

Primary Examiner—Clifton B. Cosby
Attorney, Agent, or Firm—Michael S. Striker

[57] ABSTRACT

A method for applying a tread strip having a repeating thread pattern to a carcass in which the tread strip to be applied to the carcass is cut from an elongated strip in such a manner that the pattern profile at one end of the cut off strip portion matches the pattern profice at the other end so that the length of the cut of strip portion is only approximately equal to the length of the circumference of the carcass. The cut off strip portion is then applied to a drum extending about the whole periphery of the latter, and one end of the strip is attached to a carcass abutting against the strip wound about the drum, whereafter the carcass and the drum are rotated about parallel axes in opposite directions and with the same angular velocities so as to uniformly apply the tread strip to the periphery of the carcass, regardless whether the length of the strip corresponds exactly to the length of the outer periphery of the carcass or not; and an apparatus for carrying out the method.

15 Claims, 5 Drawing Figures

PATENTED DEC 17 1974

METHOD AND APPARATUS FOR APPLYING A TREAD STRIP TO A CARCASS

BACKGROUND OF THE INVENTION

The present invention relates to a method and apparatus for applying a tread strip to the outer periphery of a carcass, as well as to an apparatus for carrying out the method.

Tread strips are usually provided on the outer face thereof with a repeating pattern which usually repeats itself at distances of three to ten centimeters in longitudinal direction of the strip. This creates difficulties in applying such tread strips with a repeating pattern to the circumference of a carcass. The tread strip to be applied to the circumference of the carcass is usually cut off from an elongated more or less endless strip, and if the cut off strip portion to be applied to the pattern is cut off at a length which is exactly equal to the circumference of the carcass, it will usually happen that the profile of the tread pattern at one end of the cut off strip portion does not match the pattern profile at the other end. When this cut off strip portion is now applied to the circumference of the carcass, the profiles at the abutting ends will not properly match with each other so that the finished tire may have at the abutting ends of the tread strip a portion which has a greater or smaller flexibility than the remainder of the tire. In addition, when the profiles of the tread strip at the abutting ends thereof do not properly match each other there will be created a dynamic imbalance of the tire with the resulting vibrations of the latter and the vehicle supported by the tire. On the other hand, if the length of the tread strip is cut off under consideration of the repeating pattern so that the profiles at the opposite ends of the cut-off strip portion will exactly match when connected to each other, the length of the thus cut off strip portion will usually differ from the length of the circumference of the carcass to which the cut off strip portion has to be applied. To compensate for this length diference it has been common practice to pre-stretch the tread strip before application of the same to the periphery of the carcass. The application of such a stretched tread strip to the carcass, however, leads to additional difficulties and attempts to overcome these difficulties have not been successful partly in view of the high cost for control apparatus required in this case.

SUMMARY OF THE INVENTION

It is an object of the present invention to provide a method of applying a tread strip with a repeating tread pattern to the circumference of a carcass while avoiding the aforementioned difficulties.

It is a further object of the present invention to provide a method of the aforementioned kind in which the tread strip to be applied to the carcass is cut from an elongated strip in such a manner that the profiles of the tread pattern at opposite ends of the cut off strip portion match each other and in which the thus formed tread strip portion is uniformly adhered to the periphery of the carcass regardless whether the length of the cut off tread strip portion is exactly equal to the length of the circumference of the carcass or not.

It is a further object of the present invention to provide for an apparatus for carrying out the aforementioned method in an efficient manner.

With these and other objects in view, the method according to the present invention of applying a tread strip with a repeating tread pattern to the circumference of a carcass mainly comprises the steps of cutting from an elongated tread strip a portion having a length approximately equal to the length of the outer circumference of the carcass in such a manner that the profile of the tread pattern at one end of the cut off portion matches the profile at the other end, placing the cut off tread strip portion around the peripheral surface of a drum which is rotatable about its axis with the tread pattern engaging the peripheral drum surface, bringing the surface of the cut off strip portion opposite the pattern surface at one end of the cut off strip portion into engagement with the peripheral surface of the carcass rotatable about an axis parallel to the drum axis, and rotating the drum and the carcass with equal angular velocities so as to equally distribute and adhere the strip portion onto the periphery of the carcass regardless whether the length of the cut off strip portion corresponds exactly to the length of the outer periphery of the carcass or not.

Preferably the method includes further the step of connecting the leading end of the cut off strip portion to the carcass and the trailing end to the drum before rotating the drum and the carcass about their axes. To properly align the tread strip with the carcass, the method may also include the step of moving the drum in axial direction to thus align the tread strip with the carcass and/or guiding the cut off strip portion during its passage from the drum onto the carcass to centralize the tread strip on the carcass.

The apparatus for carrying out the above-mentioned method mainly comprises support means, a first shaft rotatably mounted on the support means and adapted to support a carcass for rotation with said first shaft about the axis of the latter, a second shaft parallel to the first-mentioned shaft, means mounting the second shaft rotatable about its axis, a drum mounted on the second shaft for rotation therewith about the axis thereof and adapted to carry a tread strip about its outer periphery with the pattern surface of the strip engaging the outer periphery of the drum, drive means connected to one of the aforementioned shafts for rotating the same with a predetermined angular velocity and in a first direction, and transmission means between the one and the other shaft for driving the latter with the same angular velocity and in a second direction opposite to the first direction.

The aforementioned transmission means may be constructed in various different ways, for instance, the transmission means may comprise a pair of sprocket wheels of equal diameter respectively fixed to the first and the second shaft for rotation about the axes thereof and a sprocket chain wound with portions thereof about the aforementioned sprocket wheels and having intermediate the wheel portions which cross each other.

Preferably the second shaft is mounted not only for rotation about its axis but also movable toward and away from the first shaft. In such a construction the transmission means may comprise a pair of first gears respectively fixed to the first and the second shaft for rotation therewith, a pair of second gears respectively meshing with the gears of the first pair and with each other at least when the second shaft is moved towards the first shaft. The gears of the second pair of gears may be mounted, respectively, on a pair of arms which in turn are pivotally connected at one of the ends thereof to the first and second shaft for tilting about the axes thereof so that the second pair of gears may remain in engagement with each other even if the two shafts are moved for a certain distance away from each other.

In a preferred construction, the transmission means may comprise a pair of sprocket wheels respectively fixed to the first and the second shaft for rotation about the axes thereof, a pair of auxiliary shafts extending substantially parallel to the first mentioned shafts and being mounted for rotation about their axes on the support means, a pair of additional sprocket wheels respectively mounted on the auxiliary shafts, a pair of endless chains, one extending about the sprocket wheels on the first shaft and one of the additional sprocket wheels and the other extending about the sprocket wheel on the second shaft and the other of the additional sprocket wheels, and a pair of meshing gears respectively fixed to the auxiliary shafts for rotation with the latter about the axes thereof.

In this construction the means mounting the second shaft may comprise an arm pivotally mounted at one end thereof on the other of the auxiliary shafts and carrying at the other end thereof the second shaft rotatable about its axis.

The drum may comprise a plurality of segments movable with respect to each other so as to adjust the diameter of the drum in a manner well known in the art.

The drum may be mounted on the second shaft movable in axial direction of the latter and fixable to the second shaft in any axially adjusted position so that the tread strip mounted on the drum may be properly aligned with the carcass. In addition, guide means may be provided for guiding the tread strip during its passage from the drum onto the carcass to assure thereby that the tread strip is properly centered with respect to the carcass.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
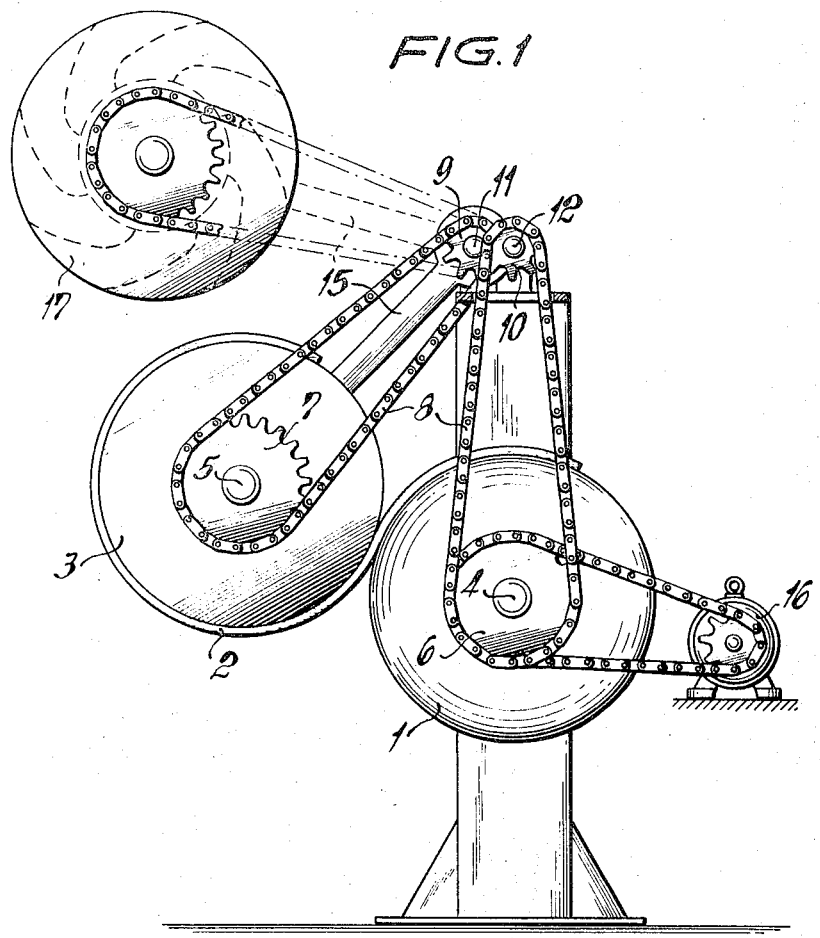
FIG. 1 is a schematic side view of one embodiment of the apparatus for applying a tread strip to a carcass in accordance with the method of the present invention.
Figure 2:
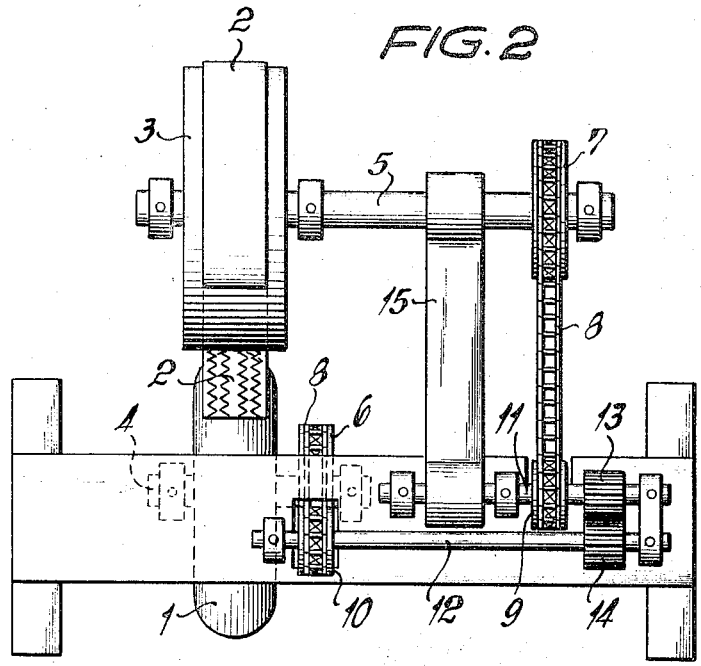
FIG. 2 is a schematic top view of the apparatus shown in FIG. 1.

FIGS. 1 and 2 schematically illustrate a first embodiment of an apparatus for carrying out the method according to the present invention. As shown in these two Figures, the apparatus mainly comprises support means in form of an upright frame which carries a first shaft 4 for rotation about a horizontal axis. The shaft 4 coaxially carries a carcass 1 for rotation with the shaft 4 but removably therefrom after a tread strip has been applied to the carcass. The apparatus includes further a drum 3 mounted on a second shaft 5 extending parallel to the shaft 4 and the drum 3 is fixed to the shaft 5 for rotation with the latter about the axis thereof. The drum 3 is adapted to carry around its periphery a tread strip 2 with the tread surface engaging the peripheral surface of the drum. The shaft 5 is carried at one end of an arm 15 which is pivotally mounted at the other end thereof in the manner as will be described later so that the drum 3 may be moved toward and away from the carcass 1.

The shaft 4 and therewith a carcass 1 mounted on the shaft for rotation therewith is driven from a drive motor 16, for instance an electric motor, which a predetermined speed in one direction, for instance by a belt drive, as schematically indicated in FIG. 1. The apparatus includes further transmission means between the shaft 4 on which the carcass 1 is mounted and the shaft 5 which carries the drum 3 for rotation therewith so as to drive the drum in a direction opposite to the direction of rotation of the carcass, but with an angular velocity equal to that of the carcass.

The transmission means may comprise, as shown in FIGS. 1 and 2, a pair of sprocket wheels 6 and 7 respectively fixed to the shafts 4 and 5 for rotation therewith, a pair of additional shafts 11 and 12 extending substantially parallel to the shafts 4 and 5 and being mounted for rotation about their axes at the top of the support frame and each carrying an additional sprocket wheel respectively designated with the reference numeral 9 and 10 for rotation therewith. The additional shafts 11 and 12 further carry coaxially fixed thereto a pair of gears 13 and 14, as shown in FIG. 2, which mesh with each other. A pair of endless chains 8 are respectively wound about the sprocket wheel 6 and the auxiliary sprocket wheel 10 and the sprocket wheel 5 and the auxiliary sprocket wheel 9. Preferably, the sprocket wheels 6 and 7 have equal diameters and equal pitch, and likewise the auxiliary sprocket wheels 9 and 10 as well as the gears 13 and 14 have respectively equal diameters and pitch so that during rotation of the shaft 4 in one direction, the shaft 5 will be rotated in the opposite direction but with the same angular velocity as the shaft 4. Of course, it is not absolutely necessary that the pairs of sprocket wheels and gears are respectively constructed with equal diameters and pitch, but the diameters and pitch of the sprocket wheels and gears may also be chosen different from each other but they must in this case be chosen in such a manner that the shaft 5 is rotated with the same velocity as the shaft 4. The upper end of the arm 15 is mounted on the additional shaft 11 for tilting movement about the axis of the latter.

The drum 3 is preferably adjustable in axial direction so that the tread strip 2 applied to the periphery of the drum may be properly aligned with the carcass 1. For this purpose, the drum may have a hub extending laterally to one side of the drum and be provided with a threaded bore therethrough through which a set screw extends engaging the shaft 5 so that by loosening the set screw the shaft position may be adjusted in axial direction whereafter the set screw is tightened to fix the drum 3 in any adjusted position to the shaft 5.

The apparatus may further include guide means engaging the tread strip 2 in the region where the tread strip passes from the drum 3 onto the carcass 1 to apply the tread strip centrally onto the carcass. Such guide means may for instance include a fork having a pair of upwardly extending prongs engaging the tread strip 2 on opposite sides thereof as it passes from the drum 3 onto the carcass, and this fork may be adjustable and fixedly connected to the supporting frame in any desired manner, well known in the art. Such guide means for laterally adjusting the position of elongated flexible members are well known in the art and are for instance extensively used in belt drives.

Figure 3:
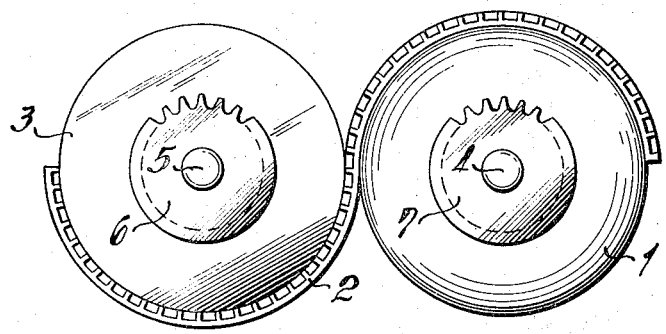
FIG. 3 is a side view of a drum and a carcass and showing a tread strip during its passage from the periphery of the drum onto the periphery of the carcass.

In carrying out the method of the present invention, with the above-described apparatus, a tread strip is cut off from an elongated, more or less endless, tread strip provided with a repeating tread pattern in such a manner that the profile of the tread pattern at one end of the cut off strip portion matches exactly the profile at the other end thereof and so that the length of the cut off strip portion is approximately equal to the length of the outer circumference of the carcass, but evidently since this tread pattern will repeat that distances of 3 to 10 centimeters, the thus cut off tread strip portion will not exactly correspond to the aforementioned lengths of the outer circumference of the carcass. The cut off tread portion is then placed around the circumference of the drum 3 with the patterned side engaging the outer drum surface, as indicated in FIG. 3. The trailing end of the tread strip 2, that is the end which will pass last onto the carcass, is then temporarily fastened to the drum 3 and either the surface of the tread strip 2 which faces away from the outer drum surface, or the peripheral surface of the carcass 1 is covered with cement or any suitable adhesive. The drum 3 is then swung by means of the arm 15 towards the carcass so that the leading end of the tread strip 2 engages the outer surface of the carcass and is fastened thereto. Thereafter, the drive motor 16 is started and the carcass 1 and the drum 3 are rotated in opposite directions but with equal angular velocity due to the aforementioned transmission means between shafts 4 and 5 so that the tread strip 2 will be evenly distributed and adhered to the periphery of the carcass regardless whether the length of the cut off strip portion 2 is exactly equal to the length of the periphery of the carcass or not.

As indicated in FIG. 1, the drum 3 may be replaced by a drum 17 which comprises a plurality of segments which are adjustable with respect to each other in a known manner so that the circumference of the drum may be changed to assure thereby that the cut off strip portion 2 may be applied about the whole periphery of the drum without being tensioned.

Figure 5:
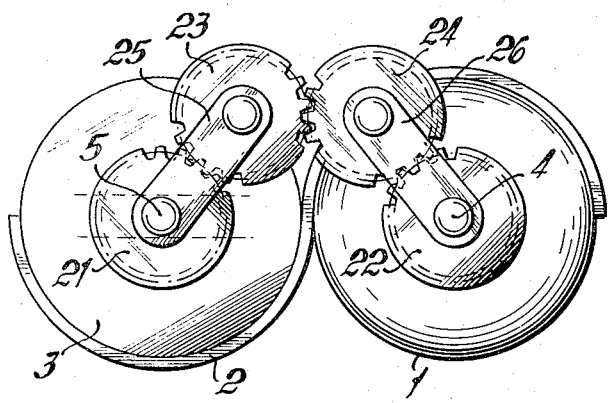
FIG. 5 is a partial schematic side view of a third embodiment of the apparatus.
Figure 4:
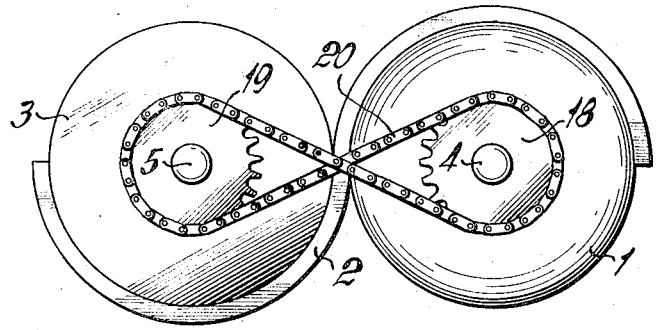
FIG. 4 is a schematic partial side view of a second embodiment of the apparatus according to the present invention.

FIGS. 4 and 5 partially and schematically illustrate two different transmission means for driving the drum 3 with an angular velocity equal to that of the carcass 1, while rotating the drum 3 in a direction opposite to the rotation of the carcass 1.

As shown in FIG. 4 the transmission means may comprise a pair of sprocket wheels 18 and 19 of equal size and pitch respectively mounted on the shafts 4 and 5 which respectively carries the carcass 1 and the drum 3 for rotation therewith, and a sprocket chain 20 extending with portions thereof about the sprocket wheels 18 and 19 and having between these sprocket wheels portions which cross each other. It is evident that in this construction the carcass 1 and the drum 3 will also be rotated with equal angular velocities and in opposite directions. Appropriate chain tightening means, well known in the art and not illustrated in FIG. 4, may be provided to permit movement of the drum 3 toward and away from the carcass 1 to facilitate application of the tread strip 2 of the drum and subsequent engagement of the leading portion of the tread strip to the carcass.

FIG. 5 shows a further modification of the transmission means for driving carcass 1 and drum 3 with equal angular velocities and in opposite directions. As schematically shown in FIG. 5, two gears 21 and 22 of equal size and pitch are respectively mounted on the shafts 4 and 5 for rotation therewith and a pair of additional gears 23 and 24, likewise of equal diameter and pitch are provided which respectively mesh with the gears 21 and 22 and with each other so that when the shaft 4 is driven in the manner as described in connection with FIG. 1, the shaft 5 will be driven with the same angular velocity as the shaft 4 and in opposite direction so that carcass 1 and drum 3 will rotate in opposite directions and with equal angular velocities. The shaft 5 may be mounted movable toward and away from the shaft 4 on guide means as indicated in dotted lines in FIG. 5 and to assure that during such movement of the shaft 5 away from the shaft 4 the gears 23 and 24 remain into engagement with each other, these gears are preferably mounted on arms 25 and 26 the lower ends of which are pivotally carried by the shafts 4 and 5.

It will be understood that each of the elements described above, or two or more together, may also find a useful application in other types of methods and apparatus for applying a tread strip with a repeating tread pattern to the circumference of a carcass differing from the types described above.

While the invention has been illustrated and described as embodied in a method and apparatus for applying a tread strip with a repeating tread pattern to the circumference of a carcass in such a manner that the abutting ends of the tread strip on the carcass will have matching pattern profiles.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A method of applying a tread strip with a repeating pattern to the circumference of a carcass comprising the steps of cutting from an elongated tread strip a portion having a length approximately equal to the length of the outer circumference of the carcass in such a manner that the profile of the tread pattern at one end of the cut off portion matches the profile at the other end; placing the cut off tread strip portion around the peripheral surface of a drum which is rotatable about its axis with the tread pattern engaging the peripheral drum surface over the whole circumference thereof;

bringing the surface of the cut off strip portion opposite to the pattern surface at one end of the cut off strip portion into engagement with the peripheral surface of a carcass rotatable about an axis parallel to the drum axis; and rotating the drum and the carcass with equal angular velocities and respectively in opposite directions so as to evenly distribute and adhere said strip portion onto the periphery of the carcass regardless whether the length of the cut off strip portion corresponds exactly to the length of the outer periphery of the carcass or not.

2. A method as defined in claim 1, and including the step of connecting said one end of said cut off strip portion to the carcass and the other end to said drum before rotating the drum and the carcass.

3. A method as defined in claim 2, and including the step of moving the drum in axial direction to align the cut off strip portion with respect to the carcass.

4. A method as defined in claim 2, and including the step of guiding the cut off strip portion during its passage from the drum onto the carcass.

5. Apparatus for applying a tread strip with a repeating pattern to the circumference of a carcass in which the profile of the tread pattern at opposite ends of the strip match each other and in which the length of the strip is only approximately equal to the length of the circumference of the carcass, said apparatus comprising support means; a first shaft rotatably mounted on said support means and supporting a carcass having a predetermined peripheral length for rotation with said first shaft about the axis of the latter; a second shaft parallel to said first shaft; means mounting said second shaft rotatable about its axis; a drum mounted on said second shaft for rotation therewith about the axis thereof, said drum having a peripheral length different from the peripheral length of said carcass and being adapted to carry a tread strip around its outer periphery over the whole drum circumference with the patterned surface of the strip engaging the outer periphery of the drum; drive means connected to one of said shafts for rotating the same with a predetermined angular velocity and in a first direction; and transmission means between said one and the other shaft for driving the latter with the same angular velocity and in a second direction opposite to said first direction.

6. An apparatus as defined in claim 5, wherein said transmission means comprise a pair of sprocket wheels of equal diameter respectively fixed to said first and said second shaft for rotation about the axes thereof and a sprocket chain wound with portions thereof about said wheels and having intermediate said wheels portions which cross each other.

7. An apparatus as defined in claim 5, wherein the means mounting said second shaft mount the latter also movable toward and away from said first shaft.

8. Apparatus as defined in claim 7, wherein said transmission means comprise a pair of first gears respectively fixed to said first and said second shafts for rotation therewith, a pair of second gears respectively meshing with the gears of said first pair and with each other at least when said second shaft is moved towards said first shaft.

9. An apparatus as defined in claim 8, wherein the gears of said second pair of gears are mounted respectively on a pair of arms which in turn are pivotally connected at one of the ends thereof to said first and said second shaft for tilting about the axes of the latter.

10. An apparatus as defined in claim 5, wherein said transmission means comprise a pair of sprocket wheels respectively fixed to said first and said second shaft for rotation about the axes thereof, a pair of auxiliary shafts extending substantially parallel to said first and said second shaft and being mounted for rotation about their axes on said support means, a pair of additional sprocket wheels respectively mounted on said auxiliary shafts, a pair of endless chains, one extending about the sprocket wheel on said first shaft and one of the additional sprocket wheels and the other extending about the sprocket wheel on the second shaft and the other of said additional sprocket wheels, and a pair of meshing gears respectively fixed to said auxiliary shafts for rotation with the latter about the axes thereof.

11. An apparatus as defined in claim 10, wherein said means mounting said second shaft comprise an arm pivotally mounted at one end thereof on said other of said auxiliary shafts and carrying at the other end thereof said second shaft rotatable about its axis.

12. An apparatus as defined in claim 5, wherein said drum is mounted on said second shaft movable in axial direction and fixable to the latter in any axially adjustable position.

13. An apparatus as defined in claim 5 and including means between said drum and a carcass mounted on said first shaft for guiding a tread strip as it passes from the drum onto the carcass to maintain the tread strip in a central position relative to the carcass.

14. A method of applying a tread-strip with a repeating pattern to the circumference of a carcass comprising the steps of cutting from an elongated tread strip a portion having a length approximately equal to the length of the outer circumference of the carcass in such a manner that the profile of the tread pattern at one end of the cut off portion matches the profile at the other end; placing the cut off tread strip portion around the peripheral surface of a drum which is rotatable about its axis with the tread pattern engaging the peripheral drum surface; adjusting the diameter of the drum to thereby change the circumference thereof so that the cut off tread strip portion may be applied in untensioned condition about the whole circumference of the drum; bringing the surface of the cut off strip portion opposite to the pattern surface at one end of the cut off strip portion into engagement with the peripheral surface of a carcass rotatable about an axis parallel to the drum axis; and rotating the drum and the carcass with equal angular velocities and respectively in opposite directions so as to evenly distribute and adhere said strip portion onto the periphery of the carcass regardless whether the length of the cut off strip portion corresponds exactly to the length of the outer periphery of the carcass or not.

15. Apparatus for applying a tread strip with a repeating pattern to the circumference of a carcass in which the profile of the tread pattern at opposite ends of the strip match each other and in which the length of the strip is only approximately equal to the length of the circumference of the carcass, said apparatus comprising support means; a first shaft rotatably mounted on said support means and adapted to support a carcass for rotation with said first shaft about the axis of the latter; a second shaft parallel to said first shaft; means mounting said second shaft rotatable about its axis; a drum mounted on said second shaft for rotation therewith about the axis thereof, said drum being adapted to carry a tread strip around its outer periphery with the patterned surface of the strip engaging the outer periphery of the drum, said drum comprising a plurality of segments movable with respect to each other so as to adjust the diameter and therewith the circumference of the drum so that the cut off tread strip portion may be applied in untensioned condition about the whole circumference of the drum; drive means connected to one of said shafts for rotating the same with a predetermined angular velocity and in a first direction; and transmission means between said one and the other shaft for driving the latter with the same angular velocity and in a second direction opposite to said first direction.

* * * * *